(No Model.)
A. F. SAMFORD & C. H. PEEVY.
COTTON CHOPPER.
No. 362,541. Patented May 10, 1887.
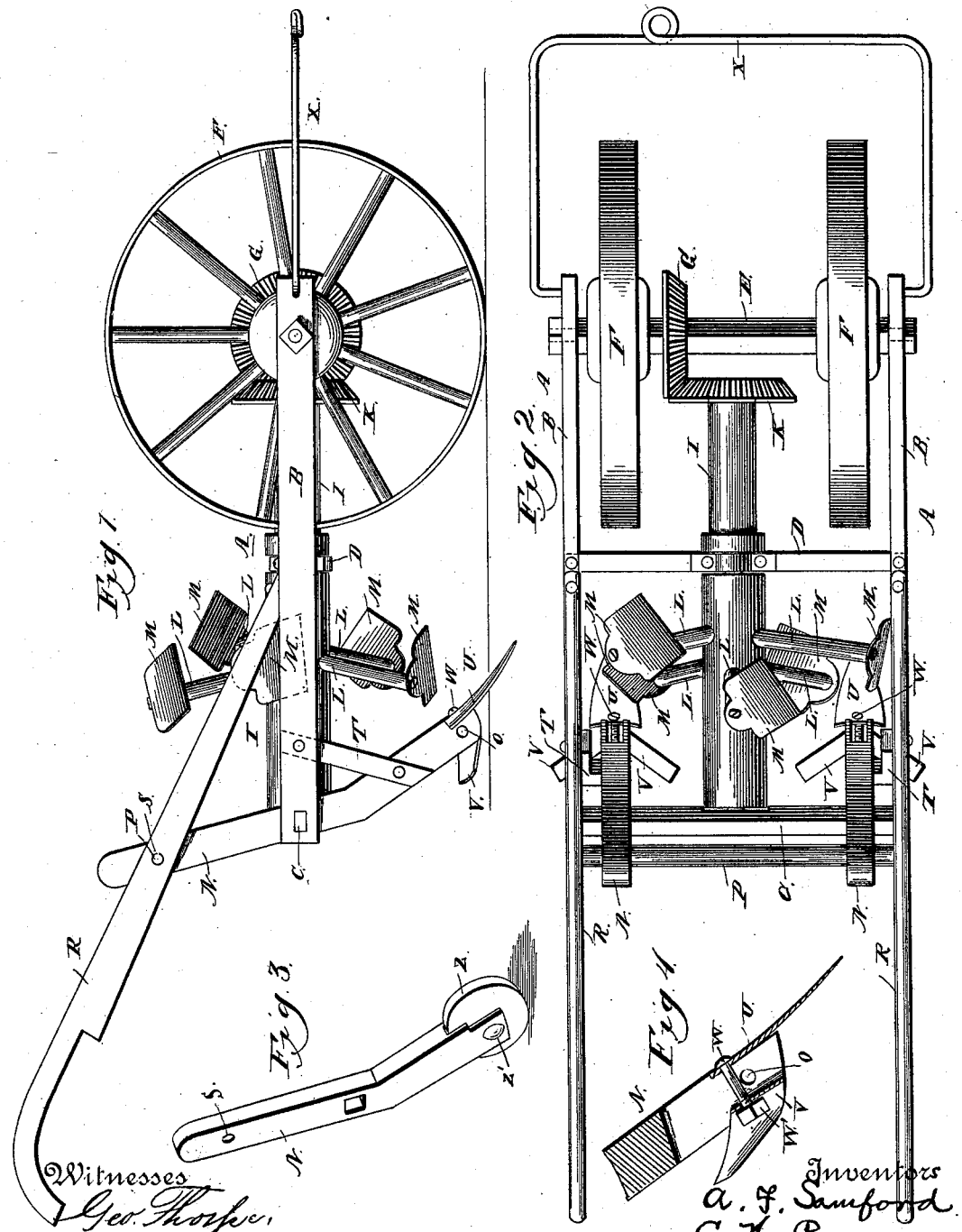

UNITED STATES PATENT OFFICE.

ASBURY FRANKLIN SAMFORD AND CHARLES HENRY PEEVY, OF CALHOUN, LOUISIANA.

COTTON-CHOPPER.

SPECIFICATION forming part of Letters Patent No. 362,541, dated May 10, 1887.

Application filed February 1, 1887. Serial No. 226,174. (No model.)

*To all whom it may concern:*

Be it known that we, ASBURY FRANKLIN SAMFORD and CHARLES HENRY PEEVY, citizens of the United States, residing at Calhoun, in the county of Ouachita and State of Louisiana, have invented a new and useful Improvement in Cotton-Choppers, of which the following is a specification.

Our invention relates to an improvement in cotton-choppers; and it consists in the peculiar construction and combination of devices, that will be more fully set forth hereinafter, and particularly pointed out in the claims.

In the drawings, Figure 1 is a side elevation of a cotton-chopper embodying our improvements. Fig. 2 is a top plan view of the same. Fig. 3 is a detached perspective view of one of the standards. Fig. 4 is a detail sectional view.

A represents a rectangular frame, comprising the side beams, B, and the connecting-beams C and D, which are arranged, respectively, at the rear ends and at the centers of the beams B.

E represents a transverse shaft, which is journaled in the front ends of the beams B, and is provided with two supporting and guiding wheels, F, the said wheels being rigidly attached to the shaft.

G represents a gear-wheel, which is also rigidly attached to the shaft.

I represents the longitudinal shaft, which is journaled in the cross-bars C and D, and is provided at its front end with a gear-wheel, K, that meshes with the wheel G, and thereby rotation is imparted to the shaft I when the machine advances.

Projecting from the shaft I, at a suitable distance from the rear end thereof, is a series of radial arms, L, which are inclined rearwardly, and are provided at their outer extremities with chopping-hoes M, which are arranged obliquely with relation to the shaft I.

N represents a pair of standards, which are attached to the rear cross-bar, C. The lower ends of the said standards are bifurcated and are provided with transverse openings O. The upper ends of the standards project above the frame A and form supporting-arms, through which passes a rung, P.

R represents handles, which are similar to plow-handles, are attached to the beams B, and project rearwardly and upwardly therefrom, and are provided with openings S, to receive the outer projecting ends of the rung P, and thereby the said rung serves to secure the handles to the upper portions of the standards. The said standards are braced and are prevented from moving rearward under strain by means of inclined rods T, which connect the said standards with the beams B.

U represents shovel-plows, and V represents scraping-plows, which are provided with outwardly-extending diverging wings. The said shovel-plows and scraping-plows are attached to the lower ends of the standards by means of bolts W, which pass through openings made in the said shovel and scraping plows, and fit in the vertical slotted openings which are formed between the bifurcated ends of the standards.

It will be observed that the shovel-plows bear against the front sides of the standards, and that the scraping-plows bear against the rear sides thereof, and that the said shovel and scraping plows are clamped in position on the standards by means of the clamping-nuts W', with which the bolts are provided.

The operation of our invention is as follows: The machine is drawn by one horse, which is attached to a bail, X, at the front end of the frame, the horse being caused to walk in the space between two parallel rows of cotton-plants, and the machine being directed by the operator, who has hold of the handles, so that the wheels F will run on opposite sides of one of the rows of plants. The rotation of the shaft I, imparted thereto as the machine progresses, causes the chopping-hoes to successively sweep through the row of plants at right angles thereto, so as to chop out those plants which happen to be in the paths described by the choppers. Those plants which are left standing by the chopping-hoes constitute the "stands," which are allowed to grow. At the same time that the plants are chopped the shovel-plows U work in the ground on opposite sides of the row, and the scrapers throw the earth toward the row of plants, thereby thoroughly cultivating them.

In some instances it is desirable not to employ the plows while chopping out the cotton-plants. In such cases we remove the plows U and the scrapers V from the standards, and substitute therefor supporting-rollers Z, which are journaled on transverse bolts Z', that are inserted in the openings O, made in the lower ends of the standards, each roller being located in the vertical slotted opening formed between the bifurcated lower ends of the standard to which it is attached. The function of these rollers Z is to support the rear end of the machine-frame, and thus render it easier for the operator to guide and direct the same.

Having thus described our invention, we claim—

1. In a cotton-chopper, the combination of a frame, a transverse driving-shaft journaled in the front of the frame and having the carrying-wheels, a longitudinal chopper-shaft geared to the driving shaft, a series of arms, L, affixed to the longitudinal shaft and arranged in an inclined position with relation to its axis, and the blades rigidly affixed to said arms and arranged in an oblique line to the axes of both the shaft and arms, substantially as specified.

2. The combination, in a cotton-chopper, with the frame and carrying-wheels, of a longitudinal chopper-shaft, a series of radial inclined arms carried by the shaft and each having an oblique blade set at an angle to the arm and the shaft, the depending standards at the rear end of the frame, having the longitudinal slots and transverse openings in the lower ends thereof, and the removable shovel and scraper U V, attached to the standard by a single bolt, W, and adapted to be interchangeable with a roller, Z, fitted in the slot of the standard and journaled on a bolt, Z', passing through the aligned opening therein, as and for the purpose set forth.

In testimony that we claim the foregoing as our own we have hereto affixed our signatures in presence of two witnesses.

ASBURY FRANKLIN SAMFORD.
CHARLES HENRY PEEVY.

Witnesses:
PETER COLLINS,
Z. T. STORY.